Oct. 23, 1945.　　　　K. RATH　　　　2,387,466
PHOTOELECTRIC EXPOSURE CONTROL
Filed Sept. 16, 1943　　　3 Sheets-Sheet 1
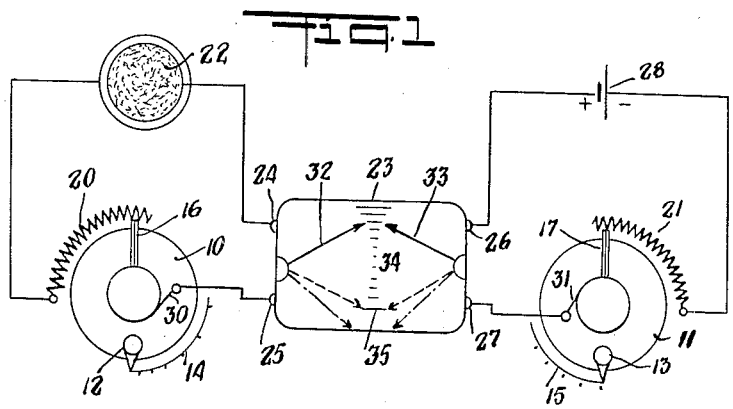
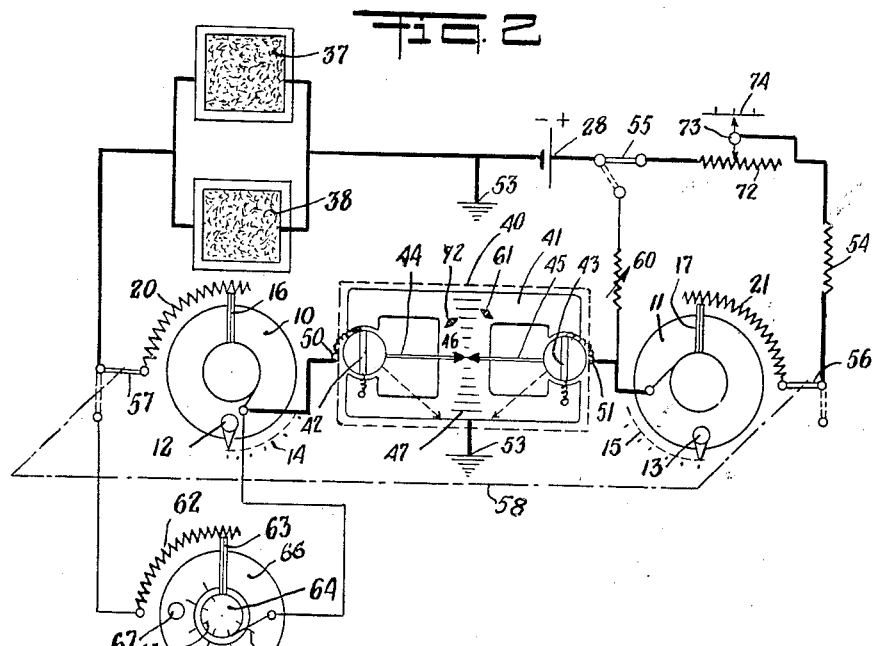
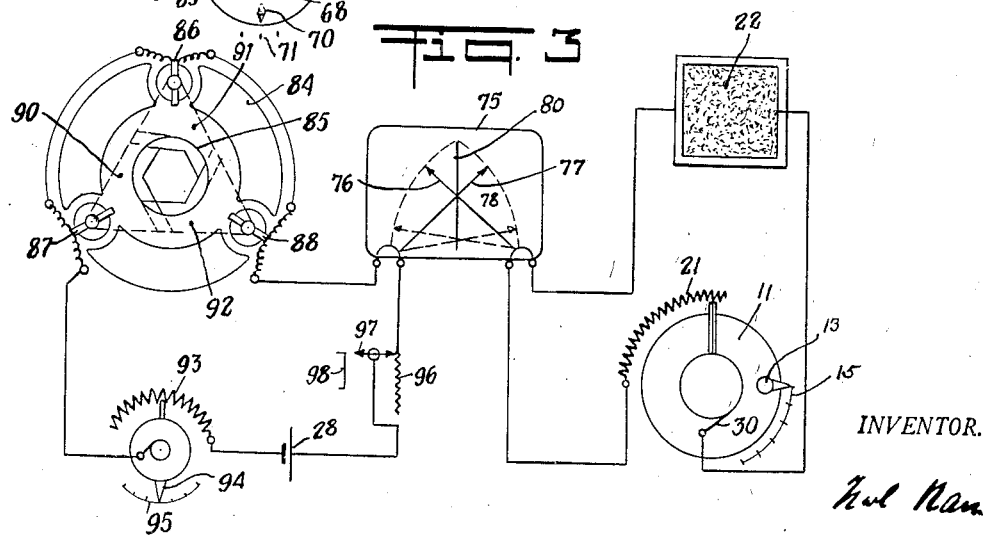
INVENTOR.

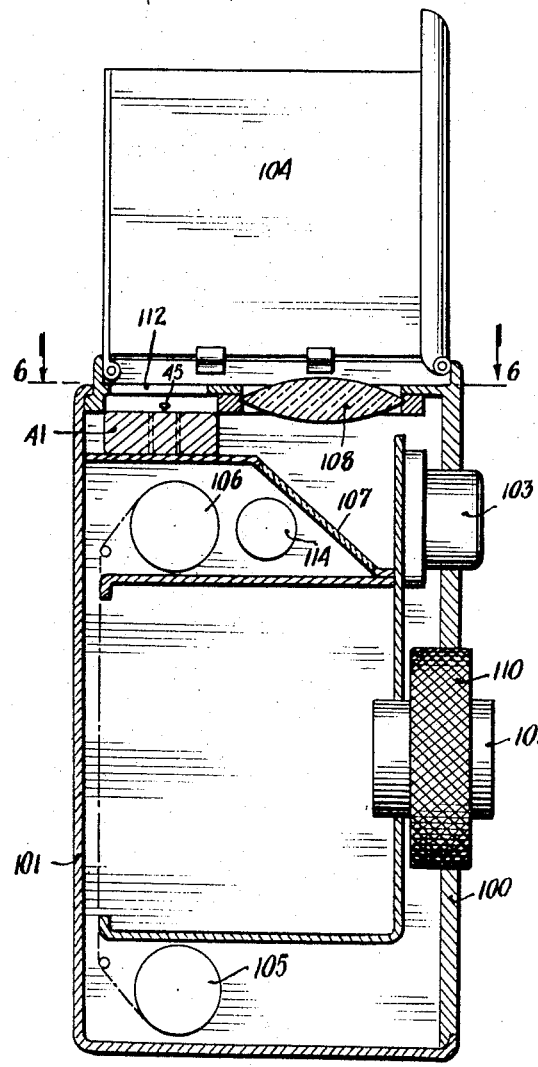

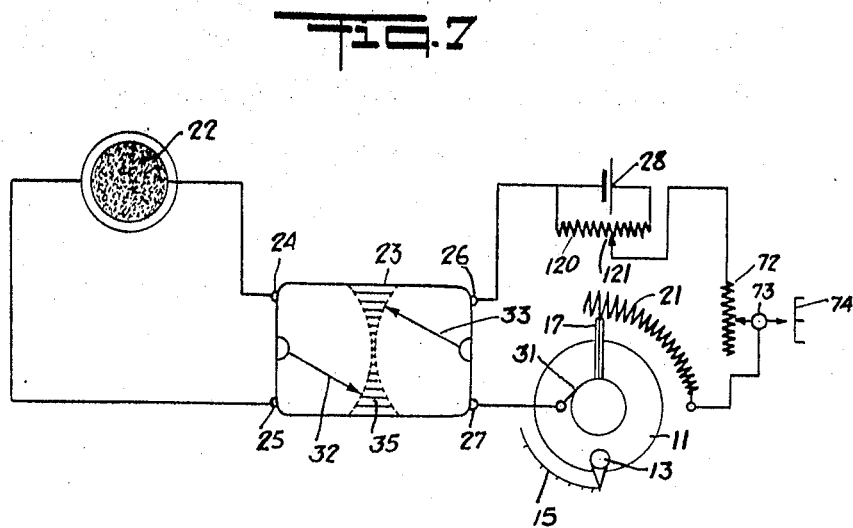
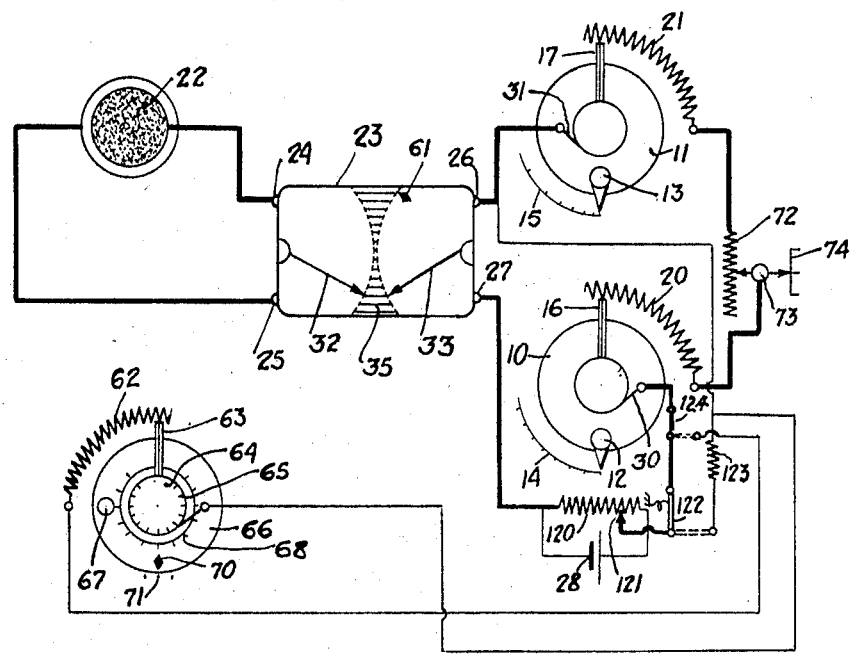

Patented Oct. 23, 1945

2,387,466

UNITED STATES PATENT OFFICE 2,387,466

PHOTOELECTRIC EXPOSURE CONTROL

Karl Rath, New York, N. Y.

Application September 16, 1943, Serial No. 502,594

12 Claims. (Cl. 95—10)

My invention relates to photographic exposure control of the general type comprising a photoelectric device and means for utilizing the response current of said device varying in proportion to the brightness of a photographic scene or object for setting the exposure control means of a camera to the proper position for obtaining a correct exposure for a given scene or object brightness.

In the standard photographic camera, exposure is determined substantially by the product of the relative lens aperture or stop adjustable to varying openings by the aid of an iris diaphragm or the like and the exposure time or period of shutter opening during which the light emanating from the scene or object being photographed and passing through the lens of a camera acts on the sensitive emulsion of the plate or film in the focal plane of the camera. Other secondary exposure controlling factors such as emulsion sensitivity or film speed, filter factors, etc. remain constant over a longer period as long as the same filter or film is used by the photographer.

The choice of the stop and exposure time adjustments is by no means arbitrary but is governed in most cases by pictorial and other considerations which makes it desirable, if not imperative, in automatic and semi-automatic exposure control to choose either adjustment to suit existing conditions and picture taking requirements and to control the other adjustment in dependence upon the response of the photoelectric device, or in other words to selectively distribute a given scene brightness or current response of the photoelectric device upon the aperture and exposure time adjustments of the camera. Thus, it may be desired or necessary to insure a certain depth of focus determined in a known manner by the stop or relative lens opening. In this case, the control should enable the adjustment of the coordinated exposure time to the proper value for any given scene or object brightness. Alternatively, there are cases when a certain exposure time or shutter speed is required to prevent blurring of the picture due to camera movement or fast moving objects or for any other reason. In this case, the control should enable the adjustment of the lens aperture to the proper value for any preselected exposure time.

Accordingly, it is an object of my invention to provide an exposure control system of the above character which is capable of mutually selective adjustment or operation by allowing either of the main exposure control adjustments, viz. lens aperture and exposure time to be chosen in advance by the photographer and enabling the other adjustment to be controlled or set to the proper value in a simple and easy manner in accordance with the response of a photoelectric device in dependence upon a prevailing scene or object brightness.

Arrangements of the aforementioned type have already become known all of which, however, possess serious disadvantages due to the fact that the different pre-setting of one adjustment will react upon or interfere differently with the other adjustment, whereby to make it impossible to insure an accurate exposure control under all circumstances without the use of complicated auxiliary devices prohibiting the embodiment of such systems in small portable cameras destined for amateur and other non-professional use.

Accordingly, a further object of my invention is to provide a photoelectric exposure control system of the above character which is both simple in design and easy to operate and which will allow both the stop and exposure time adjustments to be effected substantially independently and without mutual interference.

A difficulty encountered in exposure control apparatus of the above type is due to the fact that for reasons of space or on account of mechanical difficulties, it is not always possible to arrange the adjustable elements of the control close to the adjusting organs of the camera so as to avoid complicated mechanical transmission members and couplings with their attendant drawbacks of reduced accuracy and likelihood of getting out of adjustment during use and other defects.

Accordingly, another object of my invention is to provide exposure control apparatus of the above type, wherein adjustable mechanical connections or couplings are reduced to a minimum, whereby to both simplify the construction and operation and to increase the accuracy and reliability of the exposure adjustment.

The above and further objects and novel aspects of my invention will become more apparent as the following detailed description proceeds taken in reference to the accompanying drawings forming part of this specification and wherein:

Figure 1 is a diagrammatic representation of an exposure control system embodying the principles of the invention; Figure 2 is a more detailed diagram of an exposure control system constructed in accordance with the invention: Figure 3 is a schematic diagram illustrating a modification of the invention; Figures 4 and 5 are vertical cross-sectional and front views, respectively, of a photographic camera construction embodying exposure control apparatus of the type according to the invention; Figure 6 is a section taken on line 6—6 of Figure 5; and Figures 7 and 8 are diagrams illustrating further modifications of the invention.

Like reference characters identify like parts throughout the different views of the drawings.

Referring to Figure 1, I have indicated schematically at 10 and 11 the stop and exposure time adjusting means of a camera which may take the form of rings, discs or the like operated by means of suitable adjusting members such as knobs 12 and 13 each having a pointer or index arranged to cooperate with the stop and exposure time scales 14 and 15, respectively. Both adjustments 10 and 11 are furthermore provided or coupled with sliding contacts 16 and 17 arranged to cooperate with electrical resistance elements 20 and 21, respectively, of the wire wound or any other suitable type. Resistance 20 is connected in series with a self-generating or photovoltaic cell 22, preferably of the barrier layer selenium or cuprous oxide type, to one section or unit of a double galvanometer or twin current indicator 23 having terminals 24 and 25. The other section or unit of the indicator 23 having terminals 26 and 27 is connected in series with the resistance 21 to a source of constant electrical potential 28, such as a dry battery of the flash light or similar type. The return to the sliding contacts of resistance elements 20 and 21 is effected by slip rings or brushes 30 and 31, respectively, or in any other suitable manner known to those skilled in the art.

The indicator 23 comprises two current measuring instruments of the micro- or milliammeter type, preferably in the form of a composite structure as shown in the subsequent illustrations and having a pair of indicating pointers or needles 32 and 33 arranged to move over a dial 34, the ends of the pointers being so arranged, such as by the provision of lead lines 35, as to facilitate ascertainment of equality of the pointer deflections in a single observation, when the ends of the pointers coincide with the opposite ends of a lead line 35, as shown and readily understood from the drawings.

With the proper design of such a system and choice of the circuit constants, all that is required in operation is to choose or pre-set either of the stop or exposure time adjustments by operating knob 12 or 13, whereby to cause a certain deflection of the coordinated pointer 32 or 33 from its zero position shown in dot-dash lines in the drawings. Thereupon, the other adjustment is operated to such a point that the coordinated pointer deflection equals the deflection of the first pointers such as indicated in dashed and full lines in the drawings, provided the photoelectric cell 22 is properly aimed towards the scene or object to be photographed so that only light rays emanating from said scene will affect the sensitive surface of the cell.

The system aforedescribed may be regarded as a compensating type exposure control, wherein one of the pointer serves as a variable index or fiduciary mark for the adjustment of the other pointer. While in the example illustrated and described the stop adjustment 10 has been assumed to be associated with the circuit of the photoelectric cell 22, and the exposure time adjustment 11 is associated with the circuit of the auxiliary battery 28, it is obvious that the cell 22 and battery 28 may be mutually interchanged without substantially effecting the operation of the system.

In the practical realization of an exposure control system described, the differences in the electrical power supplied by the photoelectric cell 22 on the one hand and by the battery 28 on the other hand will require some kind of equalizing means such as the provision of a fixed series resistance in the circuit of the battery as shown in Figure 2 to be described presently, or by designing the indicator unit energized by the battery to have a correspondingly reduced sensitivity, whereby at the same time to reduce the cost and obtaining other advantages that are obvious. The battery 28 may be of the small flash light type available on the market, being about 1½″ long and having a diameter of about ½″, or it may be still smaller size, since the power required to operate the indicator is extremely small. Such battery may last from six months to one year before requiring replacement and on account of its small size and weight may be suitably accommodated even in the smaller size amateur camera.

A system as shown in Figure 1 has a certain operating range defined by the upper and lower brightness limits or response range of the photoelectric cell and the mechanical limitations and constants of the control system. These limits may be easily ascertained as will be obvious from the following. For this purpose, the design is assumed to be such that for the lowest scene brightness for which the system is designed to function in the manner described and with the adjustments 10 and 11 set so that the coordinated resistances 20 and 21 are at their zero or maximum positions, respectively, corresponding to a maximum aperture, say F.2, and a maximum exposure time, say $\frac{1}{10}$ sec., both pointers will have a minimum deflection and coincide such as shown in dashed lines in Figure 1. If now the scene brightness decreases still further, the pointer 32 of the indicator unit connected in the photoelectric circuit will be deflected to a position less than the minimum deflection shown in the drawings and inasmuch as the pointer 33 of the indicator unit in the battery circuit had already reached its lower limit determined by the full amount of resistance 21, a coincidence of the pointers will no longer be possible, whereby to apprise the operator that the lower operating limit has been passed and that automatic or semi-automatic control in the manner described is no longer possible. Under these conditions, the exposure meter may be used for manual exposure determination as will be described hereinafter.

If, on the other hand, in the position assumed, the scene brightness increases beyond the lower operating limit, the deflection of pointer 32 will increase beyond the limit position shown in dashed lines, thus making it necessary to either increase the resistance 20 and in turn decrease the aperture and/or to decrease the resistance 21 and accordingly decrease the exposure time until both pointers are again brought to coincidence, in which case stop and exposure time will be adjusted to the proper value to insure a correct exposure for the existing scene or object brightness.

In the opposite extreme of maximum scene or object brightness for which the system is designed to function, both pointers coincide at an extreme opposite position such as shown in full lines in the drawings with the resistance 20 in the photoelectric circuit being at a maximum or fully included in the circuit corresponding to the smallest aperture, say F.22, and with the resistance 21 in the battery circuit substantially at its minimum value or fully excluded from the circuit and corresponding to the smallest exposure time say, 1/250 sec. Again, if the scene brightness becomes still higher, adjustment of the pointers to coincidence will not be possible, whereby to apprise the photographer that the upper operating limit has been passed, while a decrease of the scene brightness will enable an adjustment of both resistances resulting in an increase of the aperture and/or exposure time to restore the pointer coincidence and obtain a properly exposed photograph.

Referring to Figure 2 I have shown a complete diagram of an exposure control system according to the invention embodying a composite indicator and other features of improvement suitable for structural embodiment in a camera. Elements 10 to 17, 20, 21 and 28 are substantially the same as in Figure 1, there having been shown two photovoltaic cells 37 and 38 connected in parallel and suitably mounted at different places on the camera to increase the current response and in turn the sensitivity and operating range of the control.

The indicator 40 shown is of a special design comprising a composite magnet core 41 which consists of two U-shaped sections having a common central yoke, the outer parts of each section including an air gap adapted to accommodate a moving coil 42 and 43, respectively, said moving coils carrying pointers or indicating needles 44 and 45 arranged to move over a common central dial 46 provided with lead lines 47 in substantially the same manner as shown in Figure 1. In the arrangement shown, one end of each of the moving coils is connected to the core 41 through flexible leads while the other ends are connected to insulated terminals 50 and 51 for connection with resistances 20 and 21 in the photoelectric cell and battery circuits, respectively. Thus, by connecting the core 41 as well as the common junction point between the cells 37, 38 and the battery 28 to the metal body of the camera indicated at 53, both electrical circuits are completed in substantially the same manner in Figure 1. The operation of the system will be substantially the same as described hereinabove.

The battery circuit is shown to include a further fixed resistance 54 for properly coordinating the battery current with the current supplied by the photoelectric cells, which resistance can however be omitted by the proper design of the moving coil 43 to have a reduced sensitivity compared with the coil 42, or both a different design of the coils and a fixed resistance in the battery circuit may be employed for proper coordination of the pointer indications, as is readily understood.

I have furthermore provided a first electric switch 55 inserted in the circuit of the battery 28 and a further pair of switches 56 and 57 arranged for uni-control by means of a suitable coupling or operating member indicated at 58, one of said last pair of switches being also inserted in the battery circuit and the other of said last pair of switches being inserted in the photo-electric cell circuit. I will describe at first the function of switch 55 which serves for testing the battery to enable the operator at any time to ascertain whether his camera is in proper working condition for automatic exposure adjustment or when a battery replacement is necessary, and/or to carry out slight readjustments.

Thus, by operating switch 55 normally urged to the full line position shown by a spring or the like to the dotted line position, such as by pressing a push button suitably arranged on the camera body, the resistance 21 will be disconnected and the battery connected directly in series with the respective meter unit through fixed or slightly adjustable resistance 60. The dial 46 carries a battery rejection or test mark 61 and if the battery supplies the correct operating voltage, the pointer 45 should be deflected to this mark, whereby to apprise the operator that the device is in proper working condition. In case that the pointer deflection does not coincide with mark 61, a replacement of the battery will be required. As pointed out, the extremely small amount of power necessary makes it possible to use the battery over a long period, whereby to avoid any handicap on the part of the camera user. If a new battery is inserted, it may happen that upon pressing the test switch 50, the pointer 60 will not exactly coincide with the mark 61 due to unequal characteristics of batteries of different types and makes. In this case, a potentiometer resistance associated with the battery may be slightly readjusted by means of a screw driver, knob or the like, such readjustment being easily carried out by the photographer, as shown in Figures 7 and 8 to be described hereafter.

Composite switch 56—57 when adjusted from the full line position shown to the dotted line position, serves to suspend the automatic operation and to place the system in a condition for manual exposure determination or control by opening both the photoelectric cell and battery circuits and by closing a new circuit comprising the photoelectric cells 37, 38, the left hand indicator unit and a further variable resistance 62 all connected in series as seen from the drawings. Resistance 62 has a sliding contact 63 connected with a first operating and scale member 64 in the form of a knob or disc carrying a scale 65. Member 64 is arranged to cooperate with a ring-shaped scale member 66 carrying a scale 68 and adjustable relative to member 64 by the aid of a knob 67 or the like. Member 66 is furthermore provided with an index 70 arranged to cooperate with a fixed scale 71. Scale 65 and 68 may represent stop and exposure time values or vice-versa and scale 71 may represent different film speeds. Thus, upon setting of member 66 by the aid of knob 67 to a position where the index 70 is opposite to the speed number of scale 71 corresponding to the plate or film used in the camera, adjustment of resistance 62 by the aid of member 64 until the photoelectric response current assumes a predetermined value defined by a fixed index or fiduciary mark 72 upon the dial 46, will result in proper relative alignment of the scale members 64 and 66 in such a manner that any pair of coordinated stop and exposure time values appearing opposite each other on said scales may be selected for setting the camera controls. Thus, by operating switch 56—57, manual exposure determination may be employed whenever preferred by the photographer or when the prevailing light conditions are outside the automatic range of the system as described hereinabove.

In order to consider varying film speeds or other secondary exposure determining factors, additional adjustable variable resistance elements may be inserted in the photoelectric cell and/or preferably in the battery circuit. In the example illustrated, I have shown for this purpose an adjustable resistance 72 having a control knob 73 arranged to cooperate with a film speed scale 74 and being inserted in the circuit of battery 28. In place of the series connection shown, resistance 72 may be shunted across the battery or the associated meter unit to serve as a variable potentiometer or shunt in the manner well understood by those skilled in the art.

Referring to Figure 3, I have shown a modification of the system described in the foregoing. The exposure time adjustment, variable resistance and photoelectric cell circuit are substantially the same as shown in the preceding diagrams with the exception that the photoelectric cell circuit includes resistance 21 coupled with the exposure time adjustment and that a different kind of twin indicator 75 suitable for indicating the equalization of the pointer deflections is employed. This indicator is of the cross-pointer type wherein the two units are so arranged preferably the use of a composite magnet structure similar to that shown in Figure 2, that the pointers 76 and 77 cross or intersect each other over a dial 78, whereby equalization of the deflections will be indicated if the intersection point coincides with a central or symmetry line 80. The stop adjustment shown is of the electrically controlled type comprising a magnetic actuator in the form of a ring-shaped magnet 84 encircling the lens 85 or light beam passing into the camera and being provided with a plurality of preferably equally spaced air gaps each adapted to accommodate a moving coil 86, 87 and 88, respectively. Said moving coils serve to directly operate the leaves 90, 91 and 92 of an iris diaphragm or light control device designed in a known manner so that a varying deflection of the coils in accordance with the operating current will result in a proportionate control of the aperture or central opening.

The moving coils 86, 87 and 88 are connected in the example shown, in series with the left hand unit of the indicator 75, battery 28, a first variable resistance 93 having an adjusting index 94 cooperating with a lens aperture 95 and a second adjustable resistance 96 having an adjusting index 97 cooperating with a film speed scale 98. The operation of this system is substantially similar to that of the preceding exemplification, the only difference consisting in the equalization of the pointer deflections by causing the intersection thereof to coincide with the center line 80 on the dial 78 in place of the coincidence of the extreme ends of the pointers shown in the preceding embodiments.

Referring to Figures 4 to 6, I have shown by way of example a camera of the well known twin-lens reflex type having exposure control apparatus according to Figure 2 structurally embodied therein, like or corresponding elements or parts being identified by like reference numerals. The camera shown comprises a body 100 having a removable back 101, a picture taking lens or objective 102, a view finding lens 103 and a collapsible focusing hood 104 of any construction known in the art.

Numerals 105 and 106 indicate the film spools, 107 represents the reflector or mirror and 108 a ground glass or lens for obtaining an enlarged picture to be viewed when the hood 104 is in the open or operative position as shown in the drawings. The shutter 110 is of the known central type surrounding the lens 102 and a winding knob 111 serves to move the film from the supply to the take-up spool past the picture frame in the focal plane in a manner well understood by those skilled in the art. The taking and finding lenses 102 and 103 may be advantageously coupled through a suitable coupling arrangement adapted to compensate for the different focal lengths so as to enable uni-control or focusing of the images produced on the film and on the ground glass 108 in a manner well understood.

The current indicator is suitably mounted in the space behind the ground glass 108 as shown and protected by a cover or casing provided with a window 112 through which the pointers 44 and 45 are visible. The photovoltaic cells 37 and 38 having the form of flat metal plates provided with suitable light baffles 112 and 113, respectively, of the cellular or any other type to restrict their acceptance angle to correspond with the picture or view angle of the camera, are shown mounted on both sides of the finder lens upon the front panel of the camera. The battery 114 is shown mounted adjacent to the take up spool 106 by means of suitable resilient connectors or terminals (not shown) to effect electrical connection with the other elements upon insertion, as is customary with flash lights and other electrical apparatus involving exchangeable or removable batteries and other circuit elements.

The compensating resistances 20 and 21 which advantageously are of the wire wound type are arranged on opposite sides of the shutter 110 inside the casing 100 and suitably coupled with the shutter adjusting organs, the latter projecting through arcuate slots 115 and 116 in the front wall of the camera body and terminating in adjusting knobs 12 and 13 having pointers arranged to cooperate with the scales 14 and 15 in substantially the manner described in connection with Figure 2. The resistance 72 for adjusting the film speed as well as the testing resistance 60, may be suitably mounted in the space to the right or left of the ground glass 108, while the compensating resistance 62 for manual exposure determination is shown arranged in the lower part of the casing or body 100 with the scale members 64 and 67 suitably mounted upon the outer surface as shown.

Switches 55, 56 and 57 may be suitably mounted upon the camera body in a manner to utilize the space available and the connections between the several elements are made by suitable leads or insulated wires in the manner shown in Figure 2 and understood by those skilled in the art.

An advantage of the system according to the invention are due to the purely electrical link between the shutter adjustments and the current indicator and other adjustable elements, whereby the various elements may be mounted at the places normally available in a camera without requiring complicated mechanical transmission links and couplings.

The invention assumes an especially simple character if one of the variable resistances is omitted, i. e. if only one adjustment of the camera is required, such as the aperture or stop adjustment in case of a fixed exposure time such as in moving picture cameras. In this case, the single variable resistance is advantageously included in the battery circuit, whereby the photo-electric cell is practically short-circuited at all times across the respective indicator unit, thus insuring a maximum response sensitivity as well as linearity under all circumstances. This in turn will enable the use of a more simple and cheaper indicator construction. The same applies to the variable resistance coupled with the camera adjustment which does not have to be of special design involving many thousands of turns of extremely thin insulated wire as is required for varying the relatively weak currents supplied by the photovoltaic cell.

Accordingly, Figure 7 corresponds substantially to Figure 1 with the exception that variable resistance 20 in the photoelectric circuit has been omitted, whereby the photoelectric cell 22 is constantly short-circuited across the left hand unit of the indicator 23, resulting in maximum sensitivity and linearity of the pointer deflection as a function of the object brightness. The battery circuit is shown to include the variable resistance 21 coupled with the stop adjustment 11 and being designed to vary according to a non-linear function such as by a variation of the cross-section of the successive winding turns as indicated in the drawing to obtain equal current changes in terms of final exposure as a function of the stop or aperture adjustment of the shutter.

I have furthermore shown an adjustable resistance 72 in the battery circuit for considering varying film speeds. The battery 28 is shown shunted by an adjustable potentiometer resistance 120 serially inserted in the circuit so as to enable slight readjustments of the auxiliary voltage upon aging of the battery or when making replacements and in case of different battery design or make. All that is required in this case is to readjust the trimmer contact 121 until the voltage supplied by the potentiometer has the required value which may be ascertained by the aid of a voltmeter or observing a rejection indicator as shown at 61 in Figure 2.

Referring to Figure 8, I have shown a system similar to Figure 7, wherein two variable resistances 20 and 21 coupled with the exposure time and stop adjustments, respectively, are inserted in the battery circuit, whereby to enable either adjustment to be pre-set to a desired value, whereupon the other adjustment may be operated to a position to cause pointers 32 and 33 to coincide and to effect a selective distribution of the photoelectric current upon the stop and exposure time adjustments so as to insure a correct exposure as is readily understood from the above. In addition to the resistance 72 to consider varying film speeds and adjustable potentiometer resistance 120, I have shown a further variable resistance 62 and associated mechanical calculator similar to that according to Figure 2 for manual use of the exposure meter.

In order to test the battery 28 and to make slight readjustments of the potentiometer 120, I have shown a switch 122 which when operated from the full line of the dotted line position will result in a disconnection of the variable resistances 20, 21 and 72 from the battery 28 and the potentiometer 120 and connection of the latter directly across the right hand unit of the indicator, if necessary in series with a further voltage drop resistance 123. Switch 122 may be in the form of a push button normally urged into the full line position by a spring or the like. If this switch is pressed or operated to the dotted line position, pointer 33 will be deflected in accordance with the voltage supplied by the battery 28 and potentiometer 121, and if the latter is not of the proper value as indicated by the mark 61, slight readjustments of the trimmer contact 121 may be resorted to to bring the pointer 33 to coincidence with the mark 61, thereby restoring the system to the correct operating condition. In this manner, the operator may at any time check and/or readjust the control device as to its proper and accurate operating condition.

A further switch 124 serves to disconnect the variable resistances 20, 21 and 72 and to substitute variable resistance 62 associated with a separate calculator, if it is desired to use the light meter for manual exposure determination in the manner described hereinbefore.

It will be evident from the foregoing that the invention is not limited to the specific details, constructions and arrangement of parts as well as steps disclosed and described herein for illustration, but that the underlying principle and novel thought are susceptible of numerous modifications and variations coming within the broader scope and spirit of the invention as defined by the appended claims. The specification and drawings are accordingly to be regarded in an illustrative rather than in a limiting sense.

I claim:

1. In combination with a photographic camera having adjustable lens aperture and exposure time control means, photovoltaic means to produce an electric current varying in accordance with the brightness of a scene to be photographed, a source of constant electrical potential, a twin-indicator comprising a magnet having a pair of air gaps and moving coils carrying pointers mounted in said air gaps, said pointers being arranged to enable indication of the relative deflection thereof by a single observation, circuit connections directly electrically connecting one of said moving coils to said photovoltaic means, variable electrical resistance means coupled with one of said control means, further variable resistance means coupled with the other of said control means, and further connections to provide an electric circuit including said source, the other of said moving coils and both said variable resistance means.

2. In combination with a photographic camera having adjustable exposure control means, photovoltaic means to produce an electric current varying in accordance with the brightness of a scene to be photographed, a source of constant electrical potential, a twin-indicator comprising a magnet having a pair of air gaps and moving coils carrying pointers mounted within said air gaps, said pointers being arranged to enable indication of the relative deflection thereof by a single observation, variable electrical resistance means coupled with said exposure control means, circuit connections directly electrically connecting said photovoltaic means to one of said moving coils, further connections to provide an electric circuit including said source, said resistance means and the other of said moving coils, and a further variable electrical resistance inserted in said electric circuit and adjustable in accordance with a further exposure controlling factor.

3. In combination with a photgraphic camera having adjustable exposure control means, photovoltaic means to produce an electric current varying in accordance with the brightness of a scene to be photographed, a source of constant electrical potential, a twin-indicator comprising a magnet having a pair of air gaps and moving coils carrying pointers mounted within said air gaps, said pointers being arranged to enable indication of the relative deflection thereof by a single observation, variable electrical resistance means coupled with said exposure control means, circuit connections directly electrically connecting said photovoltaic means to one of said moving coils, further connections to provide an electric circuit including said source, said resistance means and the other of said moving coils, and a further variable resistance inserted in said electric circuit and adjustable in accordance with varying emulsion speed values.

4. In combination with a photographic camera having adjustable lens aperture and exposure time control means, photovoltaic means to produce an electric current varying in accordance with the brightness of a scene to be photographed, a source of constant electrical potential, first electrical indicating means directly electrically connected to said photovoltaic means and having an indicating pointer of relatively high deflection sensitivity, second electrical indicating means having an indicating pointer of relatively low deflection sensitivity, said first and second indicating means being arranged to enable indication of the relative deflection of said pointers by a single observation, a pair of variable electrical resistance means, electrical connections to provide a circuit including said source, said second indicating means and both said variable resistance means, and coupling means between each of said control means and a separate one of said variable resistance means.

5. In combination with a photographic camera having adjustable exposure control means, photovoltaic means to produce an electric current varying in accordance with the brightness of a scene to be photographed, a source of constant electrical potential, first electrical indicating means directly electrically connected to said photovoltaic means and having an indicating pointer of relatively high deflection sensitivity, second electrical indicating means having an indicating pointer of relatively low deflection sensitivity, said first and second indicating means being arranged to enable indication of the relative deflection of said pointers by a single observation, variable electrical resistance means in positive coupling connection with said exposure control means, electrical connections to provide a circuit including said source, said second indicating means and said variable resistance means, and a further variable electrical resistance inserted in said circuit and adjustable in accordance with a further exposure controlling factor.

6. In combination with a photographic camera having adjustable exposure control means, photovoltaic means to produce an electric current varying in accordance with the brightness of a scene to be photographed, a source of constant electrical potential, first electrical indicating means directly electrically connected to said photovoltaic means and having an indicating pointer of relatively high deflection sensitivity, second electrical indicating means having an indicating pointer of relatively low deflection sensitivity, said first and second indicating means being arranged to enable indication of the relative deflection of said pointers by a single observation, variable electrical resistance means, electrical connections to provide a circuit including said source, said second indicating means and said variable resistance means in series, positive coupling means between said exposure control means and said variable resistance means, a further fixed resistance, switch means for temporarily disconnecting said second indicating means from said variable resistance means and for connecting said second indicating means to said source in series with said fixed resistance, and an index associated with said second indicating means defining a predetermined potential of said source.

7. In combination with a photographic camera having adjustable exposure control means, photovoltaic means to produce an electric current varying in accordance with the brightness of a scene to be photographed, a source of constant electrical potential, first electrical indicating means having a movable pointer and being directly electrically connected to said photovoltaic means, second electrical indicating means having a movable pointer and being connected to said source, said first and second indicating means being arranged to enable indication of the relative deflection of said pointers by a single observation, variable electrical resistance means for controlling the current of said source to said second indicating means, positive coupling means between said variable resistance means and said exposure control means, and further variable resistance means for additionally varying the current to said second indicating means and being adjustable in accordance with a further exposure controlling factor.

8. In combination with a photographic camera having adjustable exposure control means, photovoltaic means to produce an electric current varying in accordance with the brightness of a scene to be photographed, a source of constant electrical potential, first electrical indicating means having a movable pointer and being directly electrically connected to said photovoltaic means, second electrical indicating means having a movable pointer and being connected to said source, said first and second indicating means being arranged to enable indication of the relative deflection of said pointers by a single observation, variable electrical resistance means for controlling the current of said source to said second indicating means, positive coupling means between said variable resistance means and said exposure control means, and further variable resistance means for additionally varying the current to said second indicating means and being adjustable in accordance with varying emulsion speed values.

9. In combination with a photographic camera having adjustable exposure control means, photovoltaic means to produce an electric current varying in accordance with the brightness of a scene to be photographed, a source of constant electrical potential, first electrical indicating means having a movable pointer and being directly electrically connected to said photovoltaic means, second electrical indicating means having a movable pointer and being connected to said source, a common dial for both said indicating means provided with a series of lead lines connecting the ends of said pointers in predetermined deflecting positions to enable indication of the respective relative deflection of said pointers by a single observation, variable electrical resistance means for controlling the current of said source to said second indicating means, positive coupling means between said variable resistance means and said exposure control means, and further variable resistance means for additionally varying the current to said second indicating means and being adjustable in accordance with a further exposure controlling factor.

10. In combination with a photographic camera having adjustable exposure control means, photovoltaic means to produce an electric current varying in accordance with the brightness of a scene to be photographed, a source of constant electrical potential, first electrical indicating means having a movable pointer and being directly electrically connected to said photovoltaic means, second electrical indicating means having a movable pointer and being connected to said source, a common dial for both said indicating means provided with a series of lead lines connecting the ends of said pointers in predetermined deflecting positions to enable indication of the respective relative deflection of said pointers by a single observation, variable electrical resistance means for controlling the current of said source to said second indicating means, positive coupling means between said variable resistance means and said exposure control means, and further variable resistance means for additionally varying the current to said second indicating means and being adjustable in accordance with varying emulsion speed values.

11. In combination with a photographic camera having a plurality of adjustable exposure control means, first and second electrical indicating means having movable pointers and arranged to enable indication of the relative pointer deflection by a single observation, photovoltaic means directly electrically connected to one of said indicating means, a source of constant electrical potential connected to the other of said indicating means, a plurality of variable electrical resistance means connected between said source and the other of said indicating means, and positive coupling means between each of said variable resistance means and a different one of said exposure control means.

12. In combination with a photographic camera having a plurality of adjustable exposure control means, first and second electrical indicating means having movable pointers and arranged to enable indication of the relative pointer deflection by a single observation, photovoltaic means directly electrically connected to one of said indicating means, a source of constant electrical potential connected to the other of said indicating means, and a plurality of electrical resistance means all connected in series with said source and said last mentioned indicating means, and positive coupling means between each of said variable resistance means and a different one of said control means.

KARL RATH.